July 14, 1964
L. D. MASSER
3,140,880
SUSPENSION FOR AUTOMOTIVE VEHICLES
Filed May 11, 1961
2 Sheets-Sheet 1
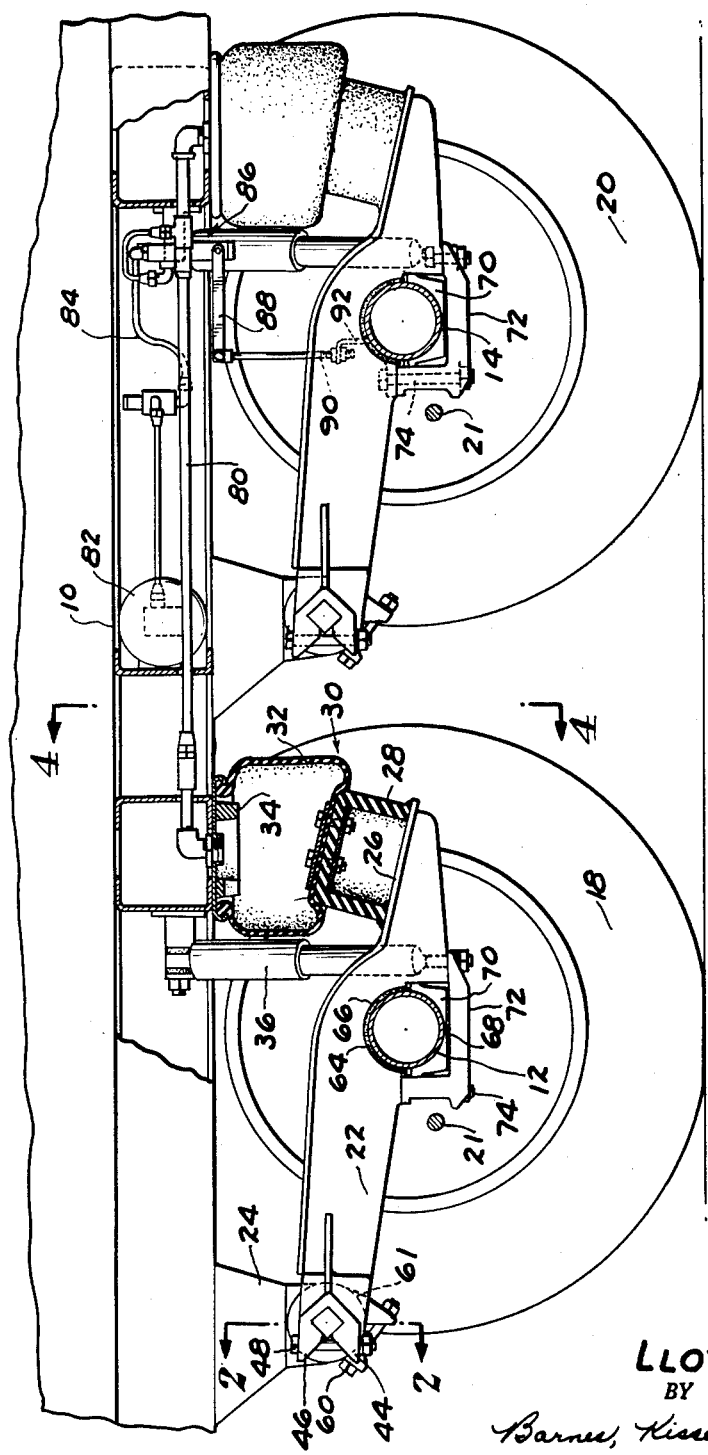
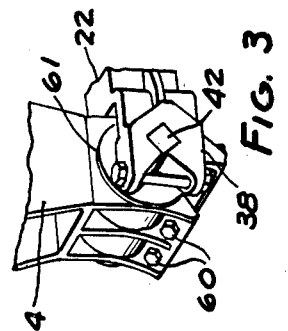
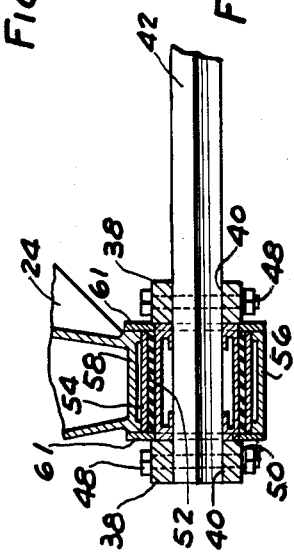
INVENTOR.
LLOYD D. MASSER
BY
Barnes, Kisselle, Raisch & Choate
ATTORNEYS July 14, 1964  L. D. MASSER  3,140,880
SUSPENSION FOR AUTOMOTIVE VEHICLES
Filed May 11, 1961  2 Sheets-Sheet 2

INVENTOR.
LLOYD D. MASSER
BY
Barnes, Kisselle, Raisch & Choate
ATTORNEYS

United States Patent Office 3,140,880
Patented July 14, 1964

3,140,880
SUSPENSION FOR AUTOMOTIVE VEHICLES
Lloyd D. Masser, Muskegon, Mich., assignor to Neway Equipment Company, Muskegon, Mich., a corporation of Michigan
Filed May 11, 1961, Ser. No. 109,542
7 Claims. (Cl. 280—124)

The suspension of this invention is especially adapted for the use of air springs in commercial vehicles and can be used as a single axle unit or in tandem arrangement of two or more axles.

The inherent lack of lateral stability of an air spring, which essentially is an air-inflated bag, has necessitated in previous air suspensions the use of relatively complicated systems of torque rods, lateral stabilizer bars, bolsters, and the like especially in tandem structures.

The object of this invention is to provide a relatively simple, inexpensive, light-weight suspension structure in whihc air springs can be used, which has improved operating characteristics, and which can be used in either single or multiple axle arrangements.

Generally the invention is carried out by providing a pair of axle-carrying arms pivoted at their forward ends to opposite sides of the vehicle frame. An air spring is provided between the rearward end of each arm and the vehicle frame. The axle is secured to the arms between the pivotal mounts and the air springs to facilitate the use of relatively small air springs. The pivotal mounts and axle mounts provide the arms all of the lateral stability necessary during operation.

The pivot and axle mounts are rubber bushed to absorb shock. A torsion bar extends between the pivotal mounts and cooperates with the rubber bushings and air springs to yieldably resist relative swinging of the arms. The ends of the torsion bar also provide pivot members. Telescoping tube type shock absorbers are used not only to dampen swinging of the arms but to provide a positive limit to downward movement of the arms and thereby protect the air bags from being pulled apart. One form of the invention is shown in the accompanying drawings.

FIG. 1 is a generally elevational view illustrating a suspension according to this invention on a vehicle, parts being shown in section to illustrate structure.

FIG. 2 is an enlarged fragmentary sectional view on line 2—2 of FIG. 1 and showing the connection between a swinging arm, frame bracket, and torsion bar.

FIG. 3 is a perspective view of the arrangement shown in FIG. 2.

Figure 4:
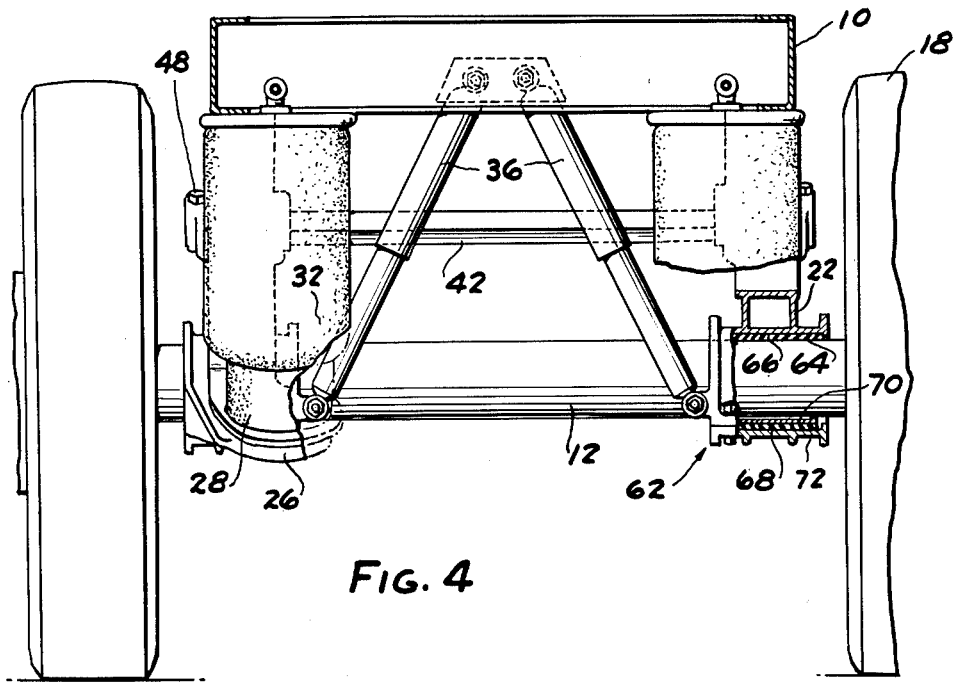
FIG. 4 is a fragmentary sectional view on lines 4—4 of FIG. 1 with parts being broken away to illustrate structure and with the axle swung downwardly to its lowermost position.

Shown in FIG. 1 is a vehicle frame 10 from which axles 12 and 14 carrying ground-engaging wheels 18 and 20 are suspended in tandem relation by substantially identical suspension units according to the present invention. The forward direction of travel of the vehicle is toward the left as FIG. 1 is viewed. A brake operating shaft is shown at 21.

Each suspension unit comprises a pair of trailing arms 22 pivoted at their forward end portions to brackets 24 depending from opposite sides of frame 10. The rearward end portion of each arm is provided with a pad 26 which supports the piston member 28 of a conventional air spring 30. The air inflated bag member 32 of the spring is anchored to vehicle frame 10 as illustrated. The air spring is provided with an internal rubber bumper 34 engaged by piston 28 in its uppermost position.

Axles 12 and 14 are secured to arms 22 at locations on the arms between air springs 30 and their forward pivoted ends. Swinging movement of the arms is dampened by conventional telescoping tube type shock absorbers 36 connected between the arms and vehicle frame. The telescoping sections of these shock absorbers will extend only a predetermined distance and thereafter they become ties which positively limit downward swinging of the axles and thereby protect the air spring elements from being torn away from each other. The lowermost position of axle 12 is illustrated in FIG. 4.

The forward end portion of each arm 22 is bifurcated to provide forks 38 which straddle and embrace the pivot structure in bracket 24. Each fork in turn has a central rectangular opening 40 through which an end portion of a rectangular bar 42 passes. Each fork 38 has split construction adjacent opening 40 to provide the clamping elements 44 and 46 which are clamped against bar 42 by bolts 48.

Each end of bar 42 is rockably supported on a bracket 24 through a torsion rubber bushing arrangement. This arrangement includes a sleeve 50 having a rectangular central opening engaged around bar 42 and in turn being surrounded by a bushing 52 of rubber or similar resiliently distortable material. Bushing 52 is surrounded by an outer metal shell 54 which is contained by forked lower end portions 56 and 58 of bracket 24. Forked portions 56 and 58 are clamped tightly together by bolts 60 and bushing 52 is bonded mechanically or otherwise to sleeves 50 and 54 so that it is stressed torsionally upon rocking movements of sleeve 50 caused by rocking of bar 42.

With this arrangement it will be seen that the end portions of bar 42 act as pivot members while the portions of the bar between its ends serve as a torsion member resiliently resisting relative swinging movements of arms 22. Rubber bushings 52 supplement the torsional connection between arms 22. In addition, bushings 52 absorb vertical shock transmitted between bar 42 and frame brackets 24.

Forks 38 bear laterally against the ends of sleeve 50 so that bar 42 and the forward ends of arms 22 are secured laterally in position by sleeve 50. Therefore bushings 52 also absorb shock transmitted between bar 42 and the vehicle frame in a direction axial of the bar. Protective washers 61 are secured axially against bushing 52 and shell 54 by forks 38 as shown in FIG. 2.

Axles 12 and 14 are secured to arms 22 through mountings 62 which are bushed by rubber or equivalent resiliently distortable material. By way of example, the bushed mountings include an upper body of rubber 64 interposed between an end of the axle and a recessed portion 66 of arm 22 and a lower body 68 disposed between a cradle 70 and a cap 72, the entire assembly being securely anchored to arm 22 by bolts 74. An axle mount of this type is shown in greater detail in my Patent No. 2,907,579, dated October 6, 1959.

This rubber bushed axle mount enables axle 12 or 14 to rock away from its horizontal disposition upon uneven swinging of arms 22 when the vehicle traverses uneven ground. Nevertheless the axle mount provides strong lateral mutual support between the arms and axle.

The air springs are controlled by pneumatic circuitry shown as including an air line 80 interconnecting the two air springs, a tank 82 for air under pressure, and air lines such as 84 for introducing air under pressure into the springs. A conventional leveling valve 86 is operated by a lever 88 through a control rod arrangement 90 transmitting vertical movements of the associated axle relative to frame 10 through a link 92.

In use the weight of frame 10 is transmitted to arms 22 partly through air springs 30 and partly through the pivotal connections between brackets 24 and the forward ends of the arms since in each suspension unit the axle is secured to arm 22 at the location between the springs and pivots. Since the air springs 30 do not carry the entire load of the vehicle, they can be made relatively small while utilizing pneumatic pressures which are no greater than usual in air spring suspensions. This means that more space is left in the vicinity of the air springs for other essential equipment and thus alleviates a perennial space problem involved in the design of commercial vehicle suspensions. Moreover since the springs are relatively small their center lines can be disposed laterally further from the longitudinal center line of the vehicle thereby providing increased stability for the vehicle.

The rubber pivotal mountings for the trailing arms and the rubber bushed axle mountings can be made axially quite long with a minimum of machined parts and thus can be made very cheaply. At the same time the length of the mounts provides very strong mutual lateral support between the interconnected members. The four rubber bushed joints or connections of themselves provide all of the lateral support necessary for arms 22 against lateral forces acting on them during the course of operation of the vehicle. No lateral stabilizer bars or equivalent members are required. The shock absorbers are shown as being angled to the vertical and therefore will provide a certain amount of lateral stability to arms 22. However, this support in fact is unnecessary because of the inherent rigidity of the rectangular arrangement of arms 22 and axle 12 or 14.

The torsional connection between the two arms provided by torsion bar 42 and torsion bushings 52 is so effective that even if the air springs at one side of the vehicle fail, frame 10 remains sufficiently level to enable the vehicle to be operated in a normal manner until repairs are effected. Nevertheless the entire system is flexible enough to facilitate normal vertical swinging of arms 22 relative to each other when the vehicle traverses uneven ground.

Rubber bushings 52 have a natural period of vibration different from that of air springs 30 and this tends to dampen out oscillatory movement of the vehicle frame relative to the running gear.

The drawings illustrate two of the suspension units mounted on a vehicle with axles 12 and 14 in tandem relation. Additional suspension units could be added according to the number of axles desired or a single unit could be mounted on a vehicle designed to carry a relatively light load. The longitudinal spacing between the units can be varied as desired. A unit can be mounted as a tag axle on a vehicle adjacent a driven axle or other running gear already provided and the pressure in the air bags can be regulated for either load distribution or traction control purposes or both.

Figure 5:
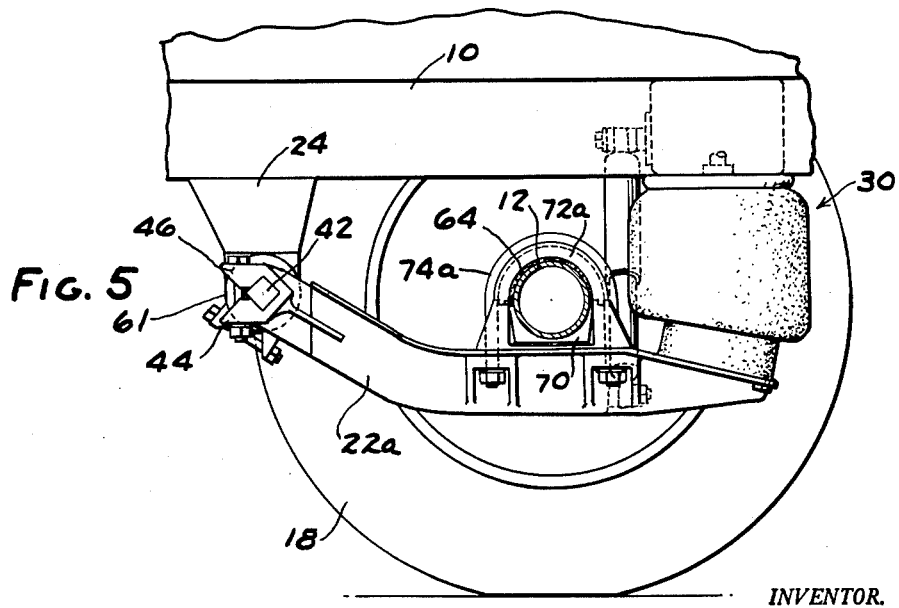
FIG. 5 is a fragmentary generally elevational view illustrating the suspension used with an underslung trailing arm.

The suspension unit illustrated in FIG. 5 is similar to that shown in FIGS. 1–4 except that trailing arm 22a is slung under axle 12 rather than above it. In this case cap 72a of the axle mount is recessed for receiving rubber shell 64 and cradle 70 rests on the top of arm 22a. The axle mounting is held together by U-bolts 74a. Operation of this arrangement is similar to that described above.

It will be appreciated that the suspension of this invention is adapted for use with springs other than air springs, such as coil springs. A salient feature is that the suspension members of themselves provide all of the rigidity required while at the same time facilitating all necessary wheel movement.

I claim:

1. In a vehicle having a frame with ground-engaging wheels suspended therefrom, improved suspension structure comprising, two arms secured to opposite sides of said frame through substantially aligned pivotal mounts, each of said pivotal mounts including a body of resiliently distortable material providing torsional resistance to swinging of its respective arm, a torsion bar secured to said arms in substantially coaxial relation with said pivotal mounts to resist relative swinging of said arms, each arm extending rearwardly of its mount longitudinally of said frame, and having a portion distal of its mount vertically underlying load-receiving means on said frame, a pneumatically expansible bag-type spring disposed in load-transmitting relation between each of said distal arm portions and load-receiving means, wheel-carrying axle means having connections to said arms at locations spaced longitudinally of the vehicle between said pivotal mounts and said portions distal thereof, said pivotal mounts and axle connections being cooperable of themselves to support said arms against lateral thrust thereon incidental to operation of said vehicle, said torsional resistance having a period of vibration different from that of said air springs to provide a dampening effect on swinging movements of said arms.

2. In a vehicle having a frame with ground-engaging wheels suspended therefrom, improved suspension structure comprising, two arms secured to opposite sides of said frame through substantially aligned pivotal mounts, said pivotal mounts being bushed with a resiliently distortable material providing a shock absorbing cushion between said frame and arms, the bushings being fixedly secured to adjacent parts of said pivotal mounts so that they provide torsional resistance to swinging of said arms, a torsion bar secured to said arms in substantially coaxial relation with said pivotal mounts to resist relative swinging of said arms, each arm extending rearwardly of its mount longitudinally of said frame, and having a portion distal of its mount vertically underlying load-receiving means on said frame, a pneumatically expansible bag-type spring disposed in load-transmitting relation between each of said distal arm portions and load-receiving means, wheel-carrying axle means having connections to said arms at locations spaced longitudinally of the vehicle between said pivotal mounts and said portions distal thereof, said pivotal mounts and axle connections being cooperable of themselves to support said arms against lateral thrust thereon incidental to operation of said vehicle, said torsional resistance having a period of vibration different from that of said air springs to provide a dampening effect on swinging movements of said arm.

3. In a vehicle having a frame with ground-engaging wheels suspended therefrom, improved suspension structure comprising, means at opposite sides of said frame forming supports aligned laterally of said vehicle, a rod having opposite end portions pivotally supported by said supports through bushings of resiliently distortable material which absorb both vertical and horizontal relative thrust between said rod and supports, two arms at opposite sides of said frame, each fixedly connected to a portion of said rod adjacent said end portion thereof, said arms trailing rearwardly of said rod longitudinally of the vehicle so that they can swing in a vertical direction about the pivoted connections provided by said end portions and supports, said bushings being fixedly secured to their adjacent parts so that they provide torsional resistance to swinging of said arms about their pivoted connections, the portions of said rod extending between said end portions thereof providing a torsion rod operative to resist relative swinging of said arms, each arm having a rearward portion distal of its mount vertically underlying load-receiving means on said frame, a pneumatically expansible bag-type spring disposed in load-transmitting relation between each of said arm portions and load-receiving means, wheel-carrying axle means having connections to said arms at locations spaced longitudinally of the vehicle between said pivotal mounts and said portions distal thereof, said pivotal mounts and axle connections being cooperable of themselves to support said arms against lateral thrust thereon incidental to operation of said vehicle.

4. In a vehicle having a frame with ground-engaging wheels suspended therefrom, improved suspension structure comprising, means at opposite sides of said frame forming supports aligned laterally of said vehicle, a rod having opposite end portions pivotally supported by said supports through bushings of resiliently distortable material arranged to absorb both vertical and horizontal relative thrust between said rod and supports, an arm at each side of said frame fixedly connected to said rod adjacent said end portions thereof, said arms trailing rearwardly of said rod and being swingable in a vertical direction about the pivotal connection provided by said supports and end portions of said rod, the portions of said rod extending between said end portions thereof providing a torsion member operative to resist relative swinging of said arms, a wheel-carrying axle extending from one of said arms to the other and having a connection to each of said arms at a location spaced longitudinally of the vehicle between said pivotal connection and a rearward portion distal of said connection, said axle being bushed with a resiliently distortable material which yields to unlike swinging of said arms but resists said unlike swinging whereby to supplement the action of said torsion member, the distal portion of each arm vertically underlying load-receiving means on said frame, a pneumatically expansible bag-type spring disposed in load-transmitting relation between each of said distal arm portions and load-receiving means, said pivotal connections and said axle connections being cooperable of themselves to support said arms against lateral thrust thereon incidental to operation of said vehicle.

5. In a vehicle having a frame with ground-engaging wheels suspended therefrom, improved suspension structure comprising, two arms secured to opposite sides of said frame through substantially aligned pivotal mounts, said arms extending longitudinally away from said mounts, wheel carrying axle means connected to said arms, spring means in load-transmitting relation between said arms and frame, said pivotal mounts including means providing a bracket at each side of the vehicle frame, a transverse bar having portions adjacent its ends forming pivot members, attaching means securing said pivot members in pivotal relation to said brackets and including a body of resiliently distortable material interposed between said pivot members and brackets, each of said arms being connected to said bar generally adjacent said pivot members, said bar having a portion between said end portions thereof forming a torsion member to yieldably resist relative rocking of said pivot members and relative swinging of said arms.

6. The combination defined in claim 5 wherein said attaching means comprises a metal sleeve substantially non-rotationally fixed to said end portion of said bar, said body of resiliently distortable material comprising a bushing surrounding said sleeve in substantially non-rotatable relation, and means fixing said bushing in substantially non-rotatable relation to said bracket so that said bushing absorbs shock transmitted between said bar and support and also torsionally resists turning of said bar about its axis incident to swinging of its attached arm, the portions of said arm connected to said bar engaging laterally against said metal sleeve so that said bushing also absorbs relative lateral thrust between said bar and bracket.

7. The combination defined in claim 5 wherein said body of resiliently distortable material is mounted to provide a torsion member yieldably resisting pivotal movement of said pivotal members relative to said brackets.

References Cited in the file of this patent
UNITED STATES PATENTS

| | | |
|---|---|---|
| 2,270,571 | Woolson et al. | Jan. 20, 1942 |
| 2,757,017 | Matthias et al. | July 31, 1956 |
| 2,827,282 | Weiss | Mar. 18, 1958 |
| 2,907,579 | Masser | Oct. 6, 1959 |
| 3,085,817 | Krause | Apr. 16, 1963 |

FOREIGN PATENTS

| | | |
|---|---|---|
| 1,002,435 | France | Oct. 31, 1951 |

OTHER REFERENCES

Maschinenfabrik (German printed application 1,010,389), June 13, 1957.